March 23, 1954  E. H. SHUMAKER  2,673,100
LIQUID-TIGHT AND GAS-TIGHT ROTATING TUBULAR JOINT
Filed Dec. 24, 1948
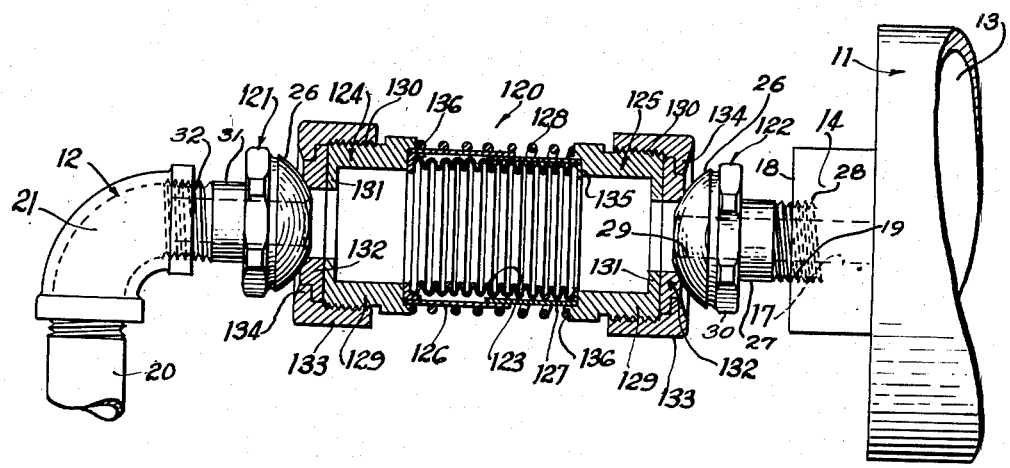
INVENTOR.
Ephraim H. Shumaker
BY Robert H. Wendt
Atty Patented Mar. 23, 1954

2,673,100

UNITED STATES PATENT OFFICE 2,673,100

LIQUIDTIGHT AND GASTIGHT ROTATING TUBULAR JOINT

Ephraim H. Shumaker, Sterling, Ill., assignor to Rotherm Engineering Company, Inc., Chicago, Ill., a corporation of Illinois Application December 24, 1948, Serial No. 67,128

3 Claims. (Cl. 285—11)

The present invention relates to liquid-tight and gas-tight rotating tubular joints, and is particularly concerned with an improved construction of such joints, which permits a replacement to be made in a very short time by removing and replacing an easily removable unit.

In the industrial arts there are many instances in which rotating parts have to be supplied with liquid or steam; and this involves a rotating connection in the conduit leading from the boiler or other source of supply to the device in question. For example, a calendering roll may be heated with superheated steam, which is supplied by a conduit which leads through the trunnions of the calendering roll; and there may be other conduits passing through the trunnions which draw off, by suction or by siphon action, the condensed liquid.

In order to provide such a connection to a tubular conduit leading axially to the trunnion of a calendering roll, the end of the trunnion may terminate in a threaded portion which is provided with tapered threads, such as pipe threads.

When the rotating tubular joint is connected to this pipe threaded opening, it will usually be found that the fitting that goes in the pipe threaded opening is not axial; and such a fitting generally tends to wabble, and this wabbling is accentuated with the length of the fitting.

The reason for this is that the male pipe threads and the female pipe threads are not concentric to the axis of the trunnion. This comes about through the fact that pipe threads are cut with taps and dies, which taps and dies have a plurality of concentrically located teeth; but the teeth are of different sharpness, and the parts of the trunnion or pipe fitting may be of different hardness or softness on different sides. Therefore, a tap or a die tends to follow the path of least resistance, and its teeth cut in more deeply on the soft side and more shallowly on the hard side so that the resultant threads are not generally concentric and generally not axial.

Thus provision must be made in any tubular rotating joint for lack of concentricity and for a universal movement or wabbling action; and this wabbling action also causes a difference in length of the distance between the fixed pipe and the fitting which is carried by the trunnion.

One of the objects of the invention is the provision of an improved rotating liquid-tight tubular joint which permits all of these necessary movements, and which is also adapted to be removed from the machine in a very short time and replaced without removing any threaded parts, thus saving the hours and minutes of stoppage which are caused when the devices of the prior art have to be repaired or replaced, since they involve the disassembly of pipe threaded members.

Another object of the invention is the provision of an improved unit connecting member which is adapted to effect a rotating liquid-tight tubular joint between a fixed pipe and a rotating pipe, even when the latter is not concentrically or axially located with respect to the former or with respect to the axis of rotation.

Another object is the provision of a joint of the class described which may be repaired or replaced without disconnecting any pipes, and which itself tends to expand into liquid-tight engagement with the fittings that are carried by the rotating part and the fixed part so that it is only necessary to contract the unit to make it shorter and to remove it from the machine so that it may be replaced with a new unit and labor stoppage minimized.

Another object of the invention is the provision of a rotating tubular joint member of the class described in the form of a cartridge type unit having an expanding characteristic so that by virtue of its own structure it is held in liquid-tight engagement with the fittings that are provided on the fixed part and the rotating part.

Another object is the provision of an improved device of the class described which is adapted to stand up under high temperatures, which operates with a minimum loss of pressure, and which may be manufactured economically, which is sturdy, simple, and efficient.

Other objects and advantages of the invention will be apparent from the following description and the accompanying drawings.

Referring to the one sheet of drawings accompanying this specification, the figure is a fragmentary elevational view in partial section, on an axial plane, of a rotating tubular joint assembly embodying the invention.

Referring to the drawing, 120 indicates in its entirety the tubular rotating joint unit, which is shown in connection with a calender roll 11 and a fixed conduit 12 leading to a source of heated steam. The calender roll 11 is hollow and has a cylindrical chamber; and it is provided with an axially extending trunnion 14 which is rotatably mounted in a bearing carried by a frame (not shown).

The trunnion 14 has a through bore 17 leading to the interior chamber of the calender roll and terminating at the outer end 18 of the trunnion in a threaded portion, which is tapped with pipe threads. The pipe threads are preferably employed because a complementary fitting becomes tighter as it is threaded into the bore, and eventually achieves a liquid-tight joint.

The steam supply conduit 12 may consist of ordinary galvanized iron pipe 20 provided with an elbow 21, the opening of which is threaded with pipe threads. In order to connect and support the tubular rotating joint unit 10, the conduit 17 of the calender roll 11 and the fixed conduit 12 are provided with suitable fittings, indicated at 122 and 121, both of these fittings being provided with a suitable, partially spherical surface 25, 26 for engagement with the unit 120 to permit the necessary swiveling universal movement between the fixed parts and the rotating parts.

For example, the fitting 122 is preferably made of hardened stainless steel, and it consists of a cylindrical pipe 27, terminating in a tapered pipe threaded portion 28 and having an internal through bore 29. The tapered pipe threaded portion 28 is threaded into the threaded bore 19 until it becomes so tight that it effects a liquid-tight joint.

At the opposite end the fitting 23 has an enlargement provided with a noncircular portion 30, such as, for example, a hexagonal or octagonal part, for receiving a wrench. The end of the fitting enlargement is indicated at 25 as being partially spherical for effecting a limited universal joint motion in contact with the joint unit 120.

The other fitting 121 may consist of a cylindrical metal pipe 31 having a pipe threaded end portion 32, which is fixedly secured in the bore 22 of the fixed conduit 12. This fitting may also be made of steel; and it has a through bore 33 and an enlargement 34, which is provided with a partially spherical surface 26, previously mentioned, and with the annular shoulder 35.

The partially spherical surface 26 has a limited universal movement in connection with the rotating joint unit 120.

The joint unit 120 of this assembly is mounted between the two ball fittings 121 and 122.

The joint unit 120 comprises a bellows 123, which is carried by a pair of packing housings 124, 125, and which is guided by a pair of telescoping tubular members 126, 127, its resilient expansive action being supplemented by spring 128.

Each packing housing comprises a tubular metal member 129, having external threads 130, and an inwardly extending end flange 131 for engaging the packing 132, which may be similar to the packing 44, previously described.

A threaded ferrule 133 has an inwardly extending annular flange 134 for engaging the annular shoulder on the packing 132, and confining it against the flange 131.

The threaded housing member 129 is secured at its inner end to an inwardly extending annular flange 135, which is carried by the tubular member 127; and it is also secured to the end flange of the bellows 123 with a liquid-tight joint, such as by soldering, brazing, or welding.

The opposite packing housing 124 may be exactly similar in construction, and may support the tubular member 126 and be secured with a liquid-tight connection to the opposite end flange of the bellows 123. Thus the bellows 123 again provides a flexible connection between the two packing housings.

The tubular guide member 126 is larger than the tubular guide member 127 so that the tube 127 slides in the tube 126; and the tube 127 may have a sliding movement with respect to the bellows confined inside it. The expansion spring 128 may be helical, and may be mounted outside the tubes 126, 127; and may engage an annular seat provided by the end surfaces 136 of the members 129.

The operation of the tubular rotating joint assembly is as follows:

The fitting 122 will not be mounted concentrically nor axially of the rotating journal 14 due to the fact that the threads for the fitting are cut with a die and the threads in the journal with a tap, and because the taps and dies make their own path and cut deeper where the metal is softer.

Thus the fittings may be at an angle to the axis of the journal and they may be eccentric with respect to the axis of the journal 14.

The fitting 121, which is supported by the fixed conduit 12, is not in accurate alignment with the axis of rotation but it is in approximate alignment and the ball shaped surfaces 25 and 26 permit a limited universal movement between each fitting and the joint unit 120. Thus as the calender roll 11 rotates the fitting 122 may wobble, but the joint unit 120 has its packing 132 constantly engaging the ball-surface on the fitting 122 to maintain a steamtight joint. The same is true of the packing 132 engaging the fitting 121.

The bellows 123, by virtue of its own resiliency, tends to expand and is initially tensioned by being compressed and it forces the packings outward. In this case it may be supplemented by the pressure of the spring 128 acting on the packing housings 124 and 125.

As the calender roll rotates, rotation may take place at each fitting 121 or 122 or both with respect to the joint unit. The wobbling action of the fittings with respect to the joint unit causes the joint unit to vary in length, but this is permitted by the bellows 123 and by the guiding sleeves 126, 128.

These sleeves prevent a whipping action of the bellows, and the elimination of this whipping action increases the life of the bellows. When the joint is filled with steam under pressure the steam acts on the projected end areas of the packing housings 124 and 125 and increases the outward pressure. Thus the sealing action of the packings is increased by increased pressure in the joint.

When it is desired to renew such a joint it is only necessary to shut off the steam pressure and to relieve the pressure by means of some valve. Then the joint unit 120 can be caused to become shorter by pressing the packing housing 125 to the left, separating the packings 132 from the fitting 122, after which the joint unit may be moved laterally at its right end until it is out of alignment with the fitting 122.

It can then be removed and a new joint unit put in place by a reverse action. Thus the machinery need not be shut down for a long time and a new joint unit can be installed in a very short time.

Universal movement may take place between each packing and its complementary ball-shaped fitting; and the rotation may take place at either or both ends of the joint. The joint unit may be removed by merely decreasing its length by applying pressure, and a new one may be installed by compressing it and permitting it to expand into engagement with the ball surfaces of the fittings 121, 122.

It will thus be observed that I have invented an improved tubular rotating liquid-tight and gas-tight joint assembly, which includes a joint unit that is generally held in place by means of the resilient expansive force exerted by the unit itself, created by the resilient springs or bellows and greatly amplified by the expansive force of the fluid pressure in the conduit.

The present joint units can be removed and replaced so quickly that the plant need only stop its operations momentarily; and the loss of time due to a defective joint or to wear or replacement is reduced to a minimum. The present joint units are simple in their construction, sturdy, and adapted to be used for a long period of time without necessity for repair or replacement.

They may be manufactured at a low cost so that they can be sold within a price range that makes them available to a larger number of the purchasing public. The amount of machining and other manufacturing operations have been reduced to a minimum, and the number of parts has been reduced to a minimum.

The materials employed are such that wear is reduced to a minimum, corrosion is substantially eliminated; and the joint units and accompanying fittings are kept in a smooth and bright liquid-tight condition by virtue of their own operation.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A rotatable fluidtight tubular joint comprising, a pair of oppositely facing metal fittings, each having an outwardly threaded tubular shank and an integral solid head having a through bore and a partially spherical annular surface surrounding said bore, the said partial spherical surfaces facing each other at predetermined spacing, and a removable joint unit comprising a pair of cylindrical metal casing members joined by a resilient metal bellows, the said casing members being externally threaded at their outer ends and having a through bore communicating with said bellows, a rigid and solid annular carbon graphite packing ring having a plane end surface engaging the outer end of each casing, and a cylindrical internally threaded metal cap threaded on the outer threaded ends of each casing and extending about and beyond each packing and having a through bore bordered by a radially inwardly extending flange overlying the outer surface of each packing ring and clamping the packing rings to the casings, each packing through bore being larger than the fitting through bore and each packing through bore being bordered by an annular outwardly facing, partially spherical surface, engaging each ball fitting, the said bellows having its ends secured in fluidtight engagement and registry with the ends of said casings, and the bellows urging the packings apart into engagement with said fittings, the internal fluid pressure in the unit increasing the end thrust on the packings and the tightness of engagement of the packings with the fittings as the internal pressure increases, the joint unit having limited universal movement relative to each fitting to maintain a fluidtight rotatable joint during relative rotation of said fittings under pressure, and when the pressure is relieved the casings and packings being capable of movement by hand pressure toward each other, one end of the unit clearing its fitting for lateral removal and replacement.

2. A rotatable fluidtight tubular joint comprising, a pair of oppositely facing metal fittings, each having an outwardly threaded tubular shank and an integral solid head having a through bore and a partially spherical annular surface surrounding said bore, the said partial spherical surfaces facing each other at predetermined spacing, and a removable joint unit comprising a pair of cylindrical metal casing members joined by a resilient metal bellows, the said casing members being externally threaded at their outer ends and having a through bore communicating with said bellows, a rigid and solid annular carbon graphite packing ring having a plane end surface engaging the outer end of each casing, and a cylindrical internally threaded metal cap threaded on the outer threaded ends of each casing and extending about and beyond each packing and having a through bore bordered by a radially inwardly extending flange overlying the outer surface of each packing ring and clamping the packing rings to the casings, each packing through bore being larger than the fitting through bore and each packing through bore being bordered by an annular outwardly facing, partially spherical surface, engaging each ball fitting, the said bellows having its ends secured in fluidtight engagement and registry with the ends of said casings, and the bellows urging the packings apart into engagement with said fittings, the internal fluid pressure in the unit increasing the end thrust on the packings and the tightness of engagement of the packings with the fittings as the internal pressure increases, the joint unit having limited universal movement relative to each fitting to maintain a fluidtight rotatable joint during relative rotation of said fittings under pressure, and when the pressure is relieved the casings and packings being capable of movement by hand pressure toward each other, one end of the unit clearing its fitting for lateral removal and replacement, and a helical spring surrounding the metal bellows and compressed between the metal casings, which the ends of the spring engage, to augment the outward resilient pressure of the unit against the fittings to maintain tight joints at the packings.

3. A rotatable fluidtight tubular joint comprising, a pair of oppositely facing metal fittings, each having an outwardly threaded tubular shank and an integral solid head having a through bore and a partially spherical annular surface surrounding said bore, the said partially spherical surfaces facing each other at predetermined spacing, and a removable joint unit comprising a pair of cylindrical metal casing members joined by a resilient metal bellows, the said casing members being externally threaded at their outer ends and having a through bore communicating with said bellows, a rigid and solid annular carbon graphite packing ring having a plane end surface engaging the outer end of each casing, and a cylindrical internally threaded metal cap threaded on the outer threaded ends of each casing and extending about and beyond each packing and having a through bore bordered by a radially inwardly extending flange overlying the outer surface of each packing ring and clamping the packing rings to the casings, each packing through bore being larger than the fitting through bore and each packing through bore being bordered by an annular outwardly facing, partially spherical surface, engaging each ball fitting, the said bellows having its ends secured in fluidtight engagement and registry with the ends of said casings, and the bellows urging the packings apart into engagement with said fittings, the internal fluid pressure in the unit increasing the end thrust on the packings and the tightness of engagement of the packings with the fittings as the internal pressure increases, the joint unit having limited universal movement relative to each fitting to maintain a fluidtight rotatable joint during relative rotation of said fittings under pressure, and when the pressure is relieved the casings and packings being capable of movement by hand pressure toward each other, one end of the unit clearing its fitting for lateral removal and replacement, and a pair of sliding tubular telescoping metal members surrounding said metal bellows and protecting it against fatigue by flexure, the said telescoping metal members each having one end secured rigidly to one of the metal casings, the other ends of said tubular members telescoping.

EPHRAIM H. SHUMAKER.

References Cited in the file of this patent

UNITED STATES PATENTS

| Number | Name | Date |
|---|---|---|
| 247,591 | White | Sept. 27, 1881 |
| 289,265 | Hurly | Nov. 27, 1883 |
| 859,426 | Betz | July 9, 1907 |
| 1,425,083 | Farrell | Aug. 8, 1922 |
| 1,603,916 | Hundemer | Oct. 19, 1926 |
| 1,923,124 | Stanley | Aug. 22, 1933 |
| 2,303,642 | Hoy | Dec. 1, 1942 |
| 2,453,428 | Gordon | Nov. 9, 1948 |
| 2,616,728 | Pitt | Nov. 4, 1952 |